(12) United States Patent
Frederick

(10) Patent No.: US 9,576,163 B2
(45) Date of Patent: Feb. 21, 2017

(54) PASSIVELY COUPLED RFID RECEIVER

(71) Applicant: Clairvoyant Technology LLC, Chapel Hill, NC (US)

(72) Inventor: Thomas J. Frederick, Chapel Hill, NC (US)

(73) Assignee: CLAIRVOYANT TECHNOLOGY LLC, Durham, NC (US)

( * ) Notice: Subject to any disclaimer, the term of this patent is extended or adjusted under 35 U.S.C. 154(b) by 92 days.

(21) Appl. No.: 14/609,951

(22) Filed: Jan. 30, 2015

(65) Prior Publication Data

US 2015/0227768 A1  Aug. 13, 2015

Related U.S. Application Data

(60) Provisional application No. 61/937,789, filed on Feb. 10, 2014.

(51) Int. Cl.
*H04Q 5/22* (2006.01)
*G06K 7/10* (2006.01)

(52) U.S. Cl.
CPC ............... *G06K 7/10009* (2013.01)

(58) Field of Classification Search
CPC ................................ G06K 7/10009
USPC ............ 340/10.1–10.5, 572.1–572.9
See application file for complete search history.

(56) References Cited

U.S. PATENT DOCUMENTS

| | | | |
|---|---|---|---|
| 5,301,367 A | 4/1994 | Heinonen | |
| 7,205,835 B1 | 4/2007 | Lie et al. | |
| 7,327,802 B2 | 2/2008 | Sanders et al. | |
| 7,369,811 B2 | 5/2008 | Bellantoni | |
| 2004/0067734 A1* | 4/2004 | Gunnarsson | B61L 25/041 455/41.2 |
| 2005/0064830 A1 | 3/2005 | Grigore | |
| 2007/0160164 A1 | 7/2007 | Sahota | |
| 2008/0079579 A1 | 4/2008 | Posamentier | |
| 2008/0227478 A1* | 9/2008 | Greene | G06K 19/0701 455/522 |

(Continued)

OTHER PUBLICATIONS

Kim, et al; "A Passive Circulator for RFID Application with High Isolation using a Directional Coupler," Proceedings of the 36th European Microwave Conference, 2006.

(Continued)

*Primary Examiner* — Ojiako Nwugo
(74) *Attorney, Agent, or Firm* — Steven B. Phillips; Moore & Van Allen PLLC

(57) ABSTRACT

A passively coupled RFID receiver is disclosed. The apparatus according to embodiments of the invention can reduce the cost of the RFID reader while significantly improving the linearity of the reader's receiver. An example system for reading RFID tags includes an active mixer passively connected to an antenna port to convert an incoming signal to a baseband signal. The baseband signal passes through a receive path, which may include other elements, and is ultimately provided to a processor that decodes the baseband signal. In some embodiments a complete RFID system making use of the passively coupled receiver includes an RFID transmitter that sends an RF carrier signal to cause the RFID tag to produce the incoming signal. In some embodiments a TX-RX coupler is connected to the transmitter, the receiver, and the antenna port, wherein the active mixer is passively connected to the antenna port through a receive port.

16 Claims, 6 Drawing Sheets

(56) References Cited

U.S. PATENT DOCUMENTS

2013/0309990 A1* 11/2013 Salleh .................. H04B 1/16
455/255
2014/0361775 A1* 12/2014 Qiu .................. G01R 33/3664
324/309
2015/0065043 A1* 3/2015 Heng .................. H04B 5/0031
455/41.1

OTHER PUBLICATIONS

Clairvoyant Technology LLC International Application No. PCT/US14/68488, International Search Report and Written Opinion, Feb. 4, 2015.

* cited by examiner

PASSIVELY COUPLED RFID RECEIVER

CROSS-REFERENCE TO RELATED APPLICATION

This application claims priority from commonly-owned U.S. Provisional Patent Application 61/937,789, filed Feb. 10, 2014, the entire disclosure of which is incorporated herein by reference.

BACKGROUND

Radio frequency identification (RFID) is used in a wide variety of logistics, supply chain, manufacturing, and other applications. For some RFID protocols the reader may modulate commands onto a radio frequency (RF) carrier signal and the RFID tags respond to the modulated commands. Often the tags use simple backscatter modulation, which requires the RFID reader to provide a carrier signal for the tags to reflect their data back to the reader.

Passive backscatter radio frequency identification (RFID) systems use the reader's transmit signal to power the tags. In most countries there are regulatory limits on how much RF power the reader can radiate. The maximum RF output power, together with the minimum activation power of the tag, determine the maximum path loss between the reader and tag. Beyond that maximum path loss the tag does not get enough RF power from the reader to operate. Given the regulatory limits on radiated transmit power and sensitivity limits of tags, the maximum read range of passive backscatter RFID tags in the ultra-high frequency (UHF) range is about 10 to 15 meters. Because of this limited read range, there are often many readers and antennas installed to provide the desired coverage. This can create a serious interference problem for readers, since the reader's receiver must simultaneously decode the very low power backscatter responses from the tags while also receiving the very high power interference from nearby readers. Because of this, linearity is important in RFID receiver design.

In addition to the reader's maximum radiated power and the tag's minimum activation power, the tag's radar cross section modulation depth determines how much modulated backscatter signal power is returned to the reader. These three parameters: transmitter power, tag sensitivity, and tag radar cross section modulation depth, determine the required sensitivity of the RFID reader's receiver.

SUMMARY

Embodiments of the present invention provide apparatus and methods for an improved RFID reader design. The apparatus according to embodiments of the invention can reduce the cost of the RFID reader while significantly improving the linearity of the reader's receiver. Linearity is important since the receiver may be subject to high interference levels from nearby readers as well as from its own transmitter. Conventional RFID receiver designs use one or more low noise amplifiers (LNA) preceding the receive mixer to optimize the receiver noise figure and sensitivity, but this high gain reduces the linearity of the receiver.

The receiver design in some embodiments reduces the cost of the RFID reader by passively connecting the TX-RX coupler to an active receive mixer, thereby eliminating RF gain stages in the receiver which are shown herein to not be necessary in a modern high performance passive UHF RFID reader. The required receiver sensitivity is obtained by connecting a TX-RX coupler passively to an active direct down conversion receive mixer, and in the example here by following the mixer with gain stages in the receiver baseband. This receiver design gives high linearity, lower cost, and adequate noise figure for passive backscatter RFID systems.

A system for reading RFID tags according to some example embodiments of the invention includes an antenna port to receive an incoming signal from an RFID tag and an active mixer passively connected to the antenna port (typically through a TX-RX coupler) to convert the incoming signal to a baseband signal. The baseband signal passes through a receive path and is ultimately provided to a processor that decodes the baseband signal. In some embodiments, a filter connected between the active mixer and the processor as part of the receive path. In some embodiments, a gain stage connected between the active mixer and the processor as part of the receive path. Filtering may be combined with the gain stage or interspersed with portions of the gain stage. In some embodiments, a transformer can be connected between the active mixer and the gain stage. The transformer can step up the voltage of the baseband signal received from the active mixer prior to both passing the signal through the gain stage and filtering the baseband signal. The transformer can also block DC, essentially performing a high-pass filtering function.

In some embodiments a complete RFID system making use of the passively coupled receiver can include an RFID transmitter and a local oscillator connected to the RFID transmitter and the active mixer. The transmitter sends an RF carrier signal to cause an RFID tag to produce the incoming signal. In some embodiments a TX-RX coupler is connected to the transmitter and the antenna port, wherein the active mixer is passively connected through a received port of the TX-RX coupler. The TX-RX coupler enables both transmitting and receiving through the same antenna or antennas connected to the antenna port of the system while minimizing interference with the receiver by the system's own transmitter.

Any or all of the stages, elements, and/or functions described above can be implemented by means of a processor together with appropriate RF hardware. The processor can be exemplified by a digital signal processor or controller executing appropriate microcode, firmware or software stored in an RFID system. Alternatively, the processor can be hardwired circuits or one or more integrated circuits, or a combination of any of these.

DETAILED DESCRIPTION OF EXAMPLE EMBODIMENTS

Embodiments of the present invention now will be described more fully hereinafter with reference to the accompanying drawings, in which embodiments of the invention are shown. This invention may, however, be embodied in many different forms and should not be construed as limited to the embodiments set forth herein. Like numbers refer to like elements throughout.

Terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" or "comprising," when used in this specification, specify the presence of stated features, steps, operations, elements, or components, but do not preclude the presence or addition of one or more other features, steps, operations, elements, components, or groups thereof. Additionally, comparative, quantitative terms such as "above", "less", "more", are intended to encompass the concept of equality, thus, "less" can mean not only "less" in the strictest mathematical sense, but also, "less than or equal to."

Unless otherwise defined, all terms (including technical and scientific terms) used herein have the same meaning as commonly understood by one of ordinary skill in the art to which this invention belongs. It will be further understood that terms used herein should be interpreted as having a meaning that is consistent with their meaning in the context of this specification and the relevant art and will not be interpreted in an idealized or overly formal sense unless expressly so defined herein. It will also be understood that when an element is referred to as being "connected" or "coupled" to another element, it can be directly connected or coupled to the other element or intervening elements may be present.

This disclosure has to do with low cost and/or high linearity backscatter RFID receiver design. It will be shown that due to regulatory restrictions on the RFID reader's transmit output power, together with the limited sensitivity of passive backscatter RFID tags, the RFID reader's receiver may only need to detect and decode tags down to the range of about −75 dBm receive power level. Furthermore, because of the full duplex nature of the backscatter RFID reader design and dense reader environments it will be shown that linearity of the reader's receiver can be of paramount importance. This disclosure shows how to design low RF gain receivers using passively connected active mixers which meet the receiver sensitivity requirement while maintaining very high linearity, at the same time reducing cost and complexity in the receiver's RF section.

Figure 1:
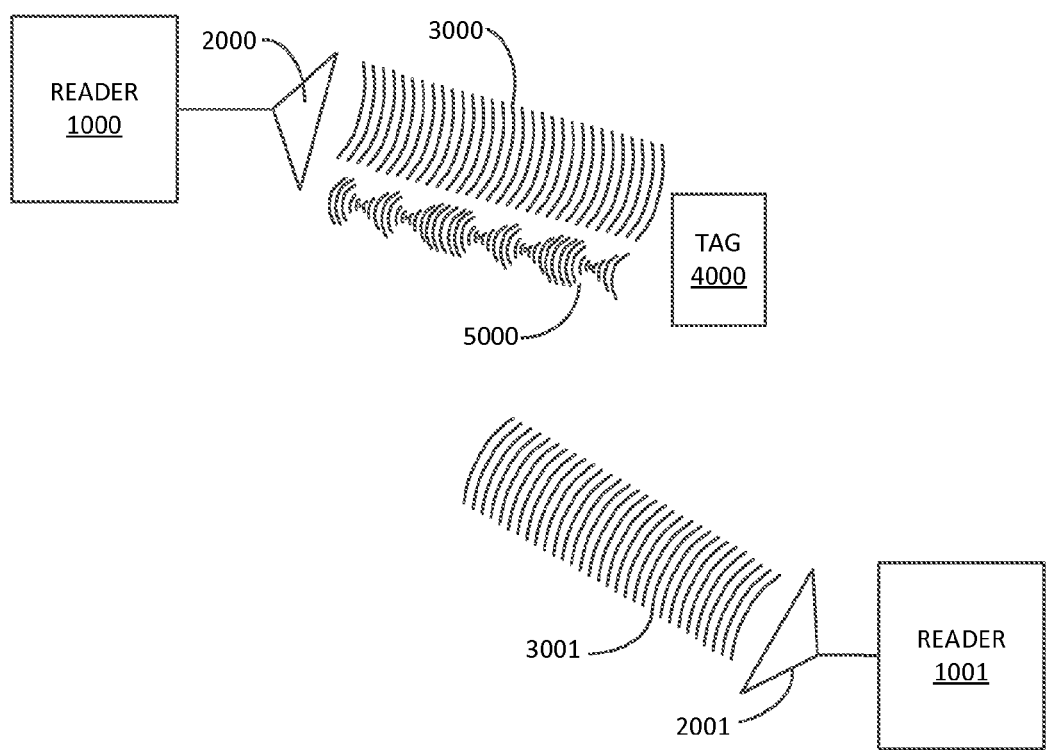
FIG. 1 is a functional block diagram of an example operating environment for an RFID system with backscatter modulated tag-to-reader communications link.

A block diagram of the operating environment of an example RFID reader 1000 is shown in FIG. 1. The reader 1000 is connected to one or more antennas 2000, which radiate the transmit signal 3000 to one or more tags 4000. Some types of RFID tags use backscatter modulation for data communications back to the RFID reader 1000. The reader 1000 will typically leave its RF carrier signal active so that one or more tags 4000 may backscatter modulate their information to the reader. If the tags 4000 are passive then they use the RF signal from the reader 1000 for power, while semi-passive tags have batteries to operate their circuitry instead of harvesting power from the reader RF transmission. All the tags 4000, whether passive or semi-passive, use the RF carrier signal from the reader 1000 as the medium to communicate back to the reader via backscatter modulation. The tags modulate their radar cross section to vary the amount of the reader's RF carrier which is reflected to the reader. This backscatter modulated RF signal 5000 is received by the reader antenna 2000 and passed into the RFID reader for decoding. Passive ISO 18000-6 and Gen2 tags typically have receive sensitivity in the range of −5 dBm to −25 dBm.

FIG. 1 also shows an interfering RFID reader 1001 which is installed in the vicinity of reader 1000. Reader 1001 is connected to one or more antennas 2001 and transmits its signal 3001 to interrogate for tags. Often a significant amount of the transmit power from reader 1001 propagates to reader 1000's antenna 2000 and therefore enters the reader's receiver. Given the relatively high transmit power of the reader 1001, when compared to the power in the backscatter signal 5000, the RFID reader receiver must be very linear to avoid compression and blocking effects in the receiver. The concepts of compression and receiver blocking are known to those skilled in the art. The issue of receiver linearity will be discussed more fully with regard to FIG. 6.

Note that although the example embodiments described herein are focused on UHF band RFID, the methods and apparatus described in the following can readily be applied to the 2.45 GHz microwave band, or other RFID readers and protocols in the UHF or microwave bands. The principal commercial advantage being addressed herein is low cost and high linearity implementation of the RFID reader receiver design.

Figure 2:
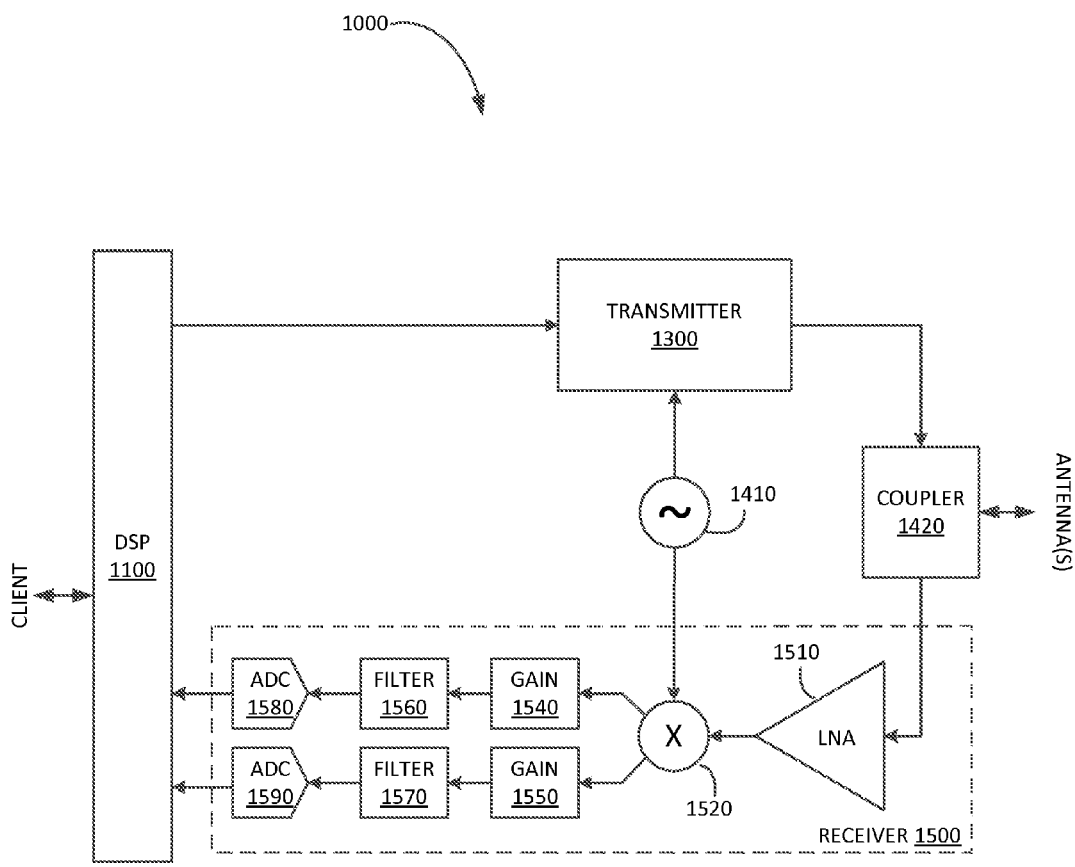
FIG. 2 is a block diagram of a conventional RFID reader using a high RF gain receiver to optimize the receiver noise figure.

FIG. 2 illustrates an architecture for RFID reader 1000. The DSP 1100 controls the transmitter 1300 which uses the RF output of the frequency synthesizer 1410 to produces a high power RF signal which is applied to a TX-RX coupler 1420. Transmitter 1300 supplies the RF carrier signal to the RFID tags, and the tags respond. The TX-RX coupler 1420 is a three-port device which facilitates simultaneously connecting both the transmitter 1300 and the receiver 1500 to the antenna or antenna multiplexing subsystem, which is not shown. The transmitter signal output from the transmitter 1300 is connected to the transmitter port of the TX-RX coupler 1420. The TX-RX coupler 1420 passes most or all of the transmitter signal to the antennas to be radiated to the interrogation zone by the antenna(s). The antenna subsystem is connected to the antenna port of TX-RX coupler 1420. Receive signals picked up by the antennas conduct into the antenna port of TX-RX coupler 1420 and are mostly or entirely passed into the receiver 1500 through the receive port connection of TX-RX coupler 1420. The TX-RX coupler design is such that the transmitter signal has minimal coupling directly into the receiver port.

High performance RFID readers such as reader 1000 typically use adaptive, active TX-RX couplers to minimize the leakage and reflections of its own transmit signal into its receiver. Adaptive TX-RX couplers contain active elements which are controlled by DSP 1100 to minimize transmitter leakage. For clarity, these active elements and DSP control are not shown in the figures. There are various ways to implement adaptive, active TX-RX couplers known to those skilled in the art. The TX-RX coupler may include programmable phase shifters and programmable attenuators, or the TX-RX coupler may use a vector modulator to perform both phase shifting and amplitude adjustment. Two example embodiments for active TX-RX couplers are referenced in U.S. Pat. Nos. 7,327,802 and 7,369,811, which are incorporated herein by reference. The TX-RX coupler 1420 may be designed using one or more directional couplers. One of the ports of the directional couplers can be used to actively adapt the transmitter-receiver isolation, often with a pair of RF diodes connected as a reflective modulator. The principal function of the TX-RX coupler 1420 is to send substantially most or all of the high power transmitter output signal to the antennas, while any signal coming into the reader from the antennas is mostly or all passed into the receiver 1500, except that transmitter reflections and leakage are cancelled within the TX-RX coupler 1420.

The receiver 1500 uses a low noise amplifier (LNA) 1510 to add gain in the RF analog stage prior to the down conversion mixer 1520. This is done is to improve the noise figure of the receiver 1500. This will be discussed in greater detail with regard to FIG. 5 and FIG. 6. Continuing with FIG. 2, the receive mixer 1520 performs a quadrature demodulation of the RF receive signal to baseband using the local oscillator signal provided by RF frequency synthesizer 1410. The baseband receive in-phase and quadrature phase signals are amplified by gain stages 1540 and 1550, respectively, and filtered by analog receive filters 1560 and 1570, respectively. In some implementations there may be more than one gain stage and the filtering may be distributed between the gain stages. In some implementations the gain and filtering can be combined by using active filters. The output of the baseband filtering and gain are input to the in-phase and quadrature-phase analog-to-digital (ADC) converters 1580 and 1590, respectively. The ADCs convert the analog signals to digital signals for further processing and decoding within the DSP 1100. The DSP 1100 interfaces with a client device to report tag responses.

Figure 3:
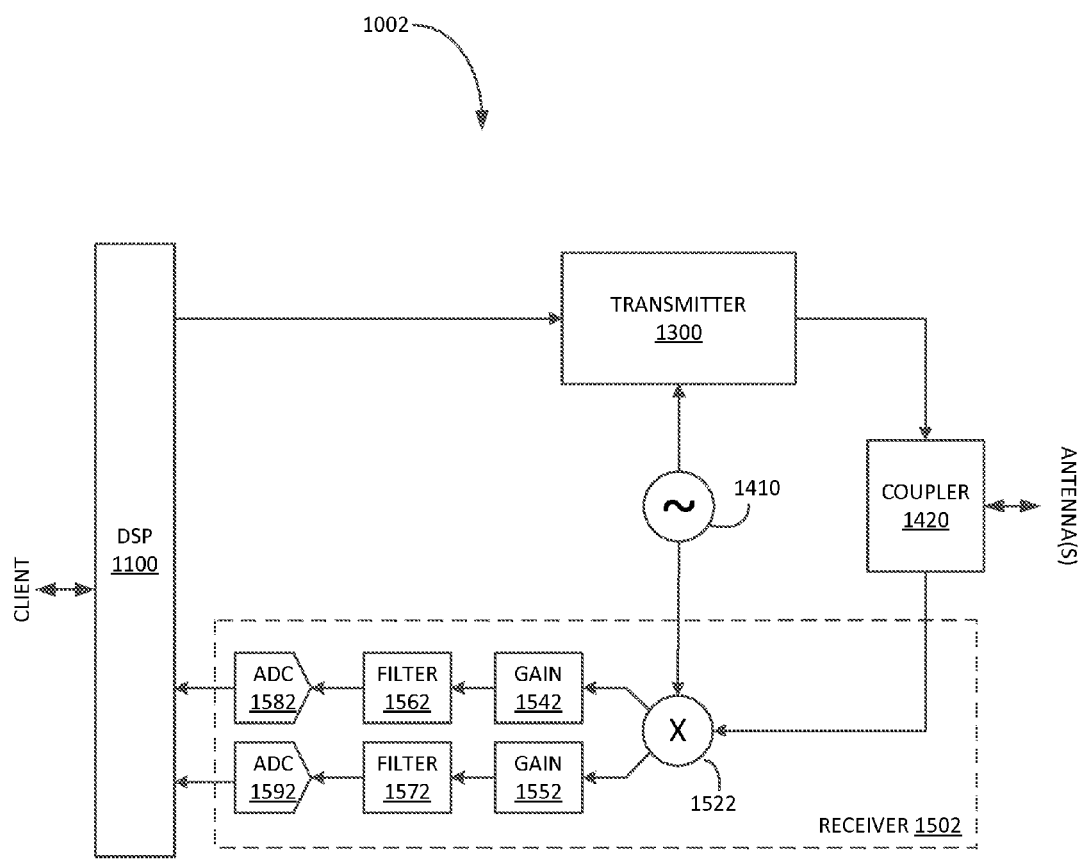
FIG. 3 is a block diagram of an RFID reader using a passive connection from the TX-RX coupler to an active mixer for high linearity and reduced cost.

FIG. 3 illustrates one embodiment of this disclosure. In RFID reader 1002, the functions of DSP 1100, transmitter 1300, frequency synthesizer 1410, and TX-RX coupler 1420 are essentially the same as in FIG. 2. However, in FIG. 3 the receiver 1502 passively connects the receive port of the TX-RX coupler to active mixer 1522 to supply the incoming signal to the mixer. It should be noted that in a system in which the transmitter and receiver are separate, the antenna port for the receiver can be passively connected to the active mixer without going through a TX-RX coupler. By passively connected it is meant that there are no active, or powered, circuit stages between the output of the TX-RX coupler 1420 (or the antenna port as the case may be) and the input to the active mixer 1522. The active mixer 1522 uses a signal from a local oscillator, in this example, RF frequency synthesizer 1410 as input for down conversion. By an active mixer, we mean a mixer which has gain stages which result in a conversion gain instead of a conversion loss. Conversion gain or loss is the net signal gain through the mixer. If the baseband output power is 10 dB less than the RF passband input power, then we say the mixer has a conversion loss of 10 dB. Typical mixer conversion loss is in the range of 9 dB to 13 dB. The net gain of an active mixer 1522 would typically be around 2 dB to 5 dB, depending on the baseband output impedance of the mixer and correct design of the matching circuitry at the output of the active mixer 1522. The reader design as shown in FIG. 3 is optimized for passive backscatter RFID. By passively connecting a TX-RX coupler 1420 to an active mixer 1522, the noise figure of the RFID receiver is sufficient for passive backscatter RFID according to the ISO 18000-6 and Gen2 protocols, while maintaining very high linearity, low cost, and low power consumption. This will be discussed in greater detail with regard to FIG. 5 and FIG. 6.

Continuing with FIG. 3, the in-phase and quadrature-phase baseband outputs of the active mixer 1522 are passed to gain stages 1542 and 1552, respectively, then to baseband filters 1562 and 1572, respectively, and finally into the analog-to-digital converters (ADCs) 1582 and 1592, respectively. The outputs of the ADCs 1582 and 1592 are passed into the DSP 1100 for decoding tag responses, which are then passed from the DSP 1100 to the client device. Note that the baseband lineup shown in FIG. 3 is just one example embodiment. The filtering may be interspersed with the gain, or the filtering may be combined with the gain by using active filters. The gain stages 1542 and 1552 will commonly occur near the output of the active mixer 1522 so that the noise figure can be maintained. However, some designs may use an AC coupled receiver topology for which a DC blocking highpass filter section may be employed between the active mixer 1522 and the first gain stage 1542 and 1552. Blocking the DC signal content before the gain is often advantageous since the residual RF leakage in the homodyne system shown in FIG. 2, FIG. 3, and FIG. 4 can be very high and can cause compression and linearity problems if it is allowed to pass through the gain stages.

Figure 4:
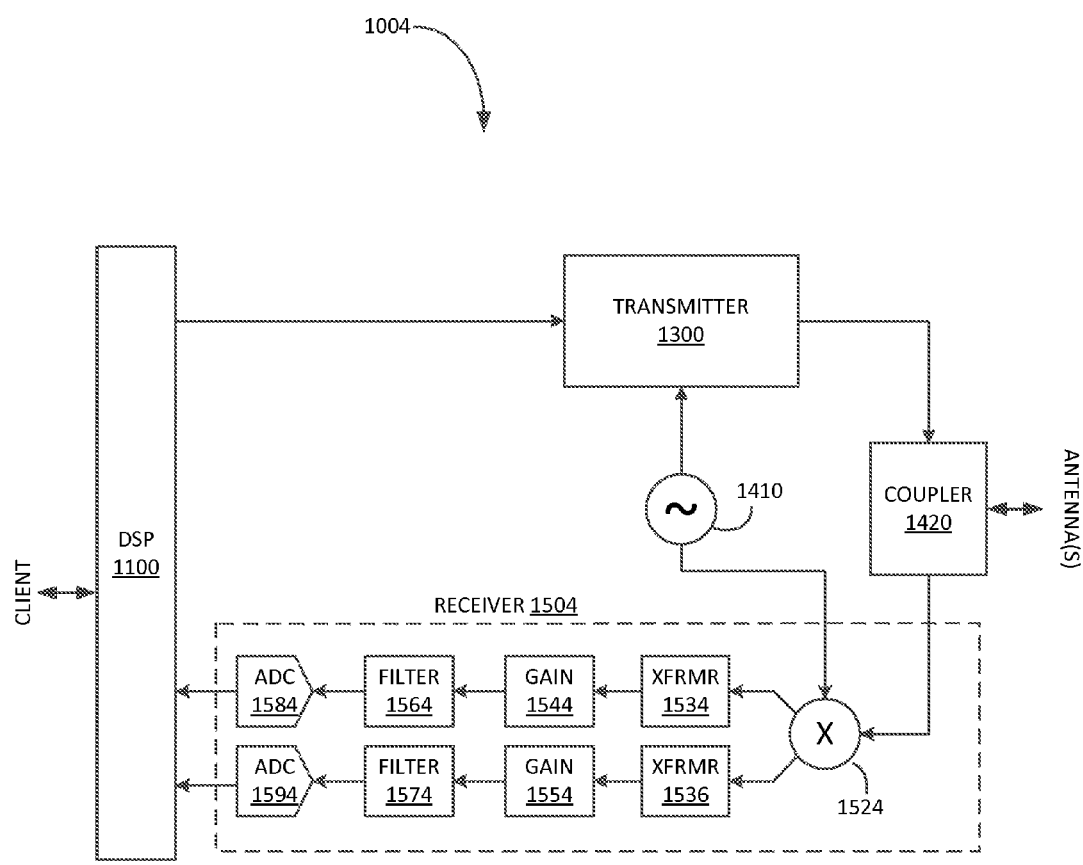
FIG. 4 is a block diagram of an RFID reader using a passive connection from the TX-RX coupler to an active mixer followed by transformers for high linearity and good noise figure.

FIG. 4 illustrates another example embodiment of this disclosure. In RFID reader 1004, the functions of DSP 1100, transmitter 1300, frequency synthesizer 1410, and TX-RX coupler 1420 are essentially the same as in FIG. 2. In FIG. 4 the receiver 1504 passively connects the receive port of the TX-RX coupler 1420 to active mixer 1524. The embodiment of FIG. 4 has transformers 1534 and 1536 at the baseband output of active mixer 1524. The transformers 1534 and 1536 may be conventional transformers or autotransformers, in which part of its windings is included in both the input and output circuits. In either case, the transformers 1534 and 1536 have two primary functions: first is to step up the voltage signal providing a noiseless voltage gain, and second is to perform a highpass function by blocking DC and reducing unneeded low frequency signal components. The transformers are followed by active gain stages 1544 and 1554 which provide additional gain to set the receiver noise figure. These are followed by baseband filters 1564 and 1574 in the baseband in-phase and quadrature-phase paths, respectively, whose outputs are send to the ADCs 1584 and 1594, respectively. Note that the gain and filtering can be accomplished in a variety of ways familiar to those skilled in the art.

Figure 5:
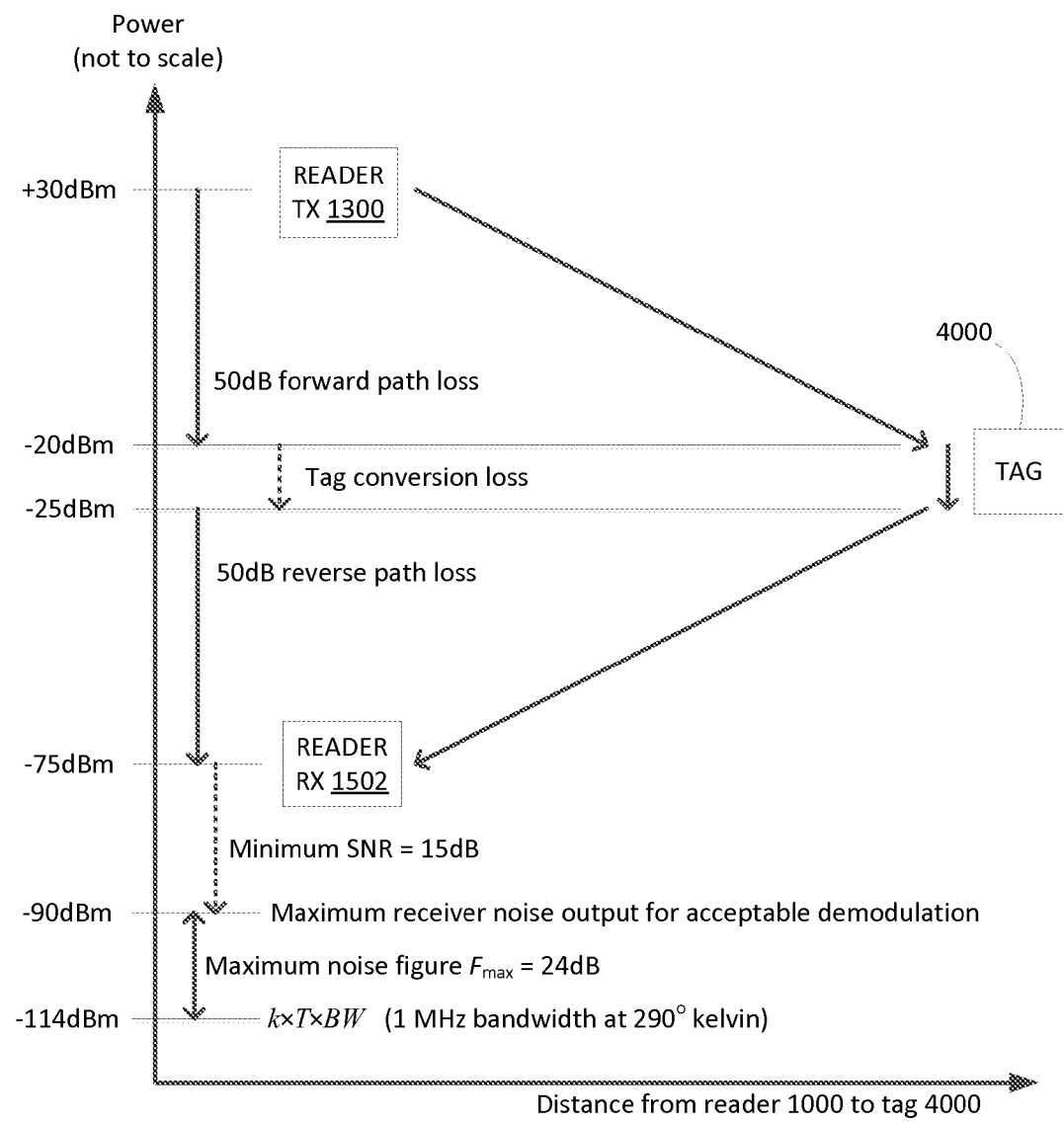
FIG. 5 is a diagram illustrating the communications link budget for a passive ultra-high frequency (UHF) backscatter RFID system.

FIG. 5 displays an example link budget for typical modern RFID systems where tag sensitivities are in the range of −5 dBm to −25 dBm. In passive RFID systems the tags 4000 rely on the forward radiating power from the RFID reader's transmitter 1300 to power the tags. Under most regulatory environments the transmitter 1300 can conduct approximately one to two watts into the antenna. The example link budget in FIG. 5 uses +30 dBm, or one watt. The forward path loss is given by the Friis equation, well known to those skilled in the art. The best passive tag sensitivity as of this writing is in the range of −18 dBm. This is the required power harvested at the tag 4000 for the tag to power up and communicate with the RFID reader 1000. With future improvements in semiconductor technology, tags may achieve −20 dBm or even better sensitivity. Using −20 dBm as the minimum tag sensitivity in FIG. 5, this suggests the range, and therefore forward path loss, is limited to 50 dB when the transmitter output power is +30 dBm.

Not all of the power reaching the tag is backscatter modulated back to the reader. This reduction in backscatter modulation level is referred to as conversion loss in FIG. 5. A conversion loss of 5 dB is typical. Referring to FIG. 5, at the maximum range the reader's transmit signal reaches the tag at a received power level of −20 dBm, then for a 5 dB backscatter conversion loss the tag signal sent back to the reader is −25 dBm. For monostatic antenna RFID systems the radio path is reciprocal, meaning the reverse path loss is the same as the forward path loss. Given the −20 dBm minimum activation power, the 5 dB conversion loss, and the 50 dB reverse path loss, it can be seen that the minimum receive signal strength at the reader will be −75 dBm in this example.

For the common signal encoding used in RFID backscatter modulation a signal-to-noise ratio (SNR) of from 10 dB to 15 dB is required to achieve desired decoder accuracy levels. FIG. 5 uses 15 dB as the SNR requirement, which yields a maximum noise floor from the receiver 1502 of −90 dBm. Note that the link budget analysis of FIG. 5 applies to any passive backscatter RFID receiver, including 1500, 1502, or 1504. For the purposes of the link budget analysis in FIG. 5 the reader receiver 1502 in assumed. In the absence of self-noise from the reader's own transmitter, it is well known to those skilled in the art that the radio receiver will have a minimum noise set by the thermal noise in the receiver together with the receiver's bandwidth BW and noise figure NF. The thermal noise density $N_0$, in watts per hertz, is $$N_0 = k \cdot T,$$

where k is Boltzmann's constant and T is the receiver temperature in Kelvin. This corresponds to approximately −174 dBm/Hz at 290 degrees Kelvin. The total thermal noise power into the receiver depends on the receiver bandwidth in Hertz. Using 1 MHz receiver bandwidth corresponds to 60 dB, i.e., this is $$BW = 10 \cdot \log_{10}(10^6 \text{ Hertz}) = 60 \text{ dB},$$

then the total thermal noise power into the receiver is k·T·BW=−114 dBm. Note that there are many ways to measure the bandwidth of a system. Those skilled in the art are familiar with the concept of equivalent noise bandwidth, which is the definition used herein. The −114 dBm noise level would suggest a 24 dB margin compared to the −90 dBm maximum receiver noise output calculated above to achieve the desired performance level. However, all receivers add a certain amount of noise to the theoretical minimum. This added noise above the theoretical minimum is referred to as noise figure NF, measured in dB.

Figure 6:
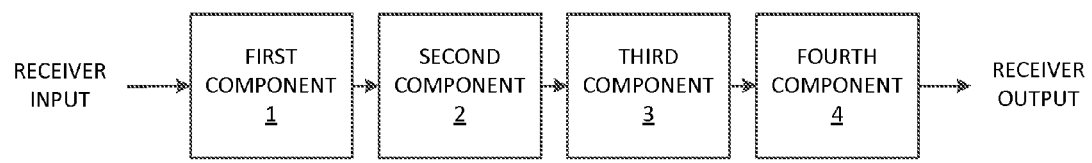
FIG. 6 is a block diagram of a generic receiver lineup with multiple processing components in series, each having an associated gain (loss), noise figure, and output intercept point.

Those skilled in the art know how to calculate the noise figure of a receiver from the line-up of components that make up the receiver. FIG. 6 shows a conceptual component lineup for an RFID receiver. The receiver may consist of circulators, isolators, directional couplers, low noise amplifiers, mixers, baseband amplifiers, transformers, limiting diodes, as well as other possible components. Each individual component is characterized by a gain (or loss) and noise figure. Components which attenuate the signal, i.e., components with a loss L have a noise figure equal to the loss NF=L in dB. Active components which have gain are characterized by their gain G and by their noise figure NF. The overall receiver noise figure can be calculated using the Friis formula for a cascade of components. The Friis formula uses the linear gain $g_n$ and noise factor $F_n$ of the $n^{th}$ component in the line-up, where $$F_n = 10^{NF_n/10},$$

is the relationship between the linear noise factor $F_n$ and the noise figure $NF_n$ in dB of the $n^{th}$ component, and $$g_n = 10^{G_n/10},$$

is the relationship between the linear gain $g_n$ and the gain $G_n$ in dB of the $n^{th}$ component. For N components in the cascaded line up, where N=4 in FIG. 6, the total noise factor can be found with the Friis formula $$F = F_1 + \frac{F_2 - 1}{g_1} + \frac{F_3 - 1}{g_1 \cdot g_2} + \frac{F_4 - 1}{g_1 \cdot g_2 \cdot g_3} + \ldots + \frac{F_N - 1}{\prod_{n=1}^{N-1} g_n}$$

The total noise figure of the receiver is $NF = 10 \cdot \log_{10}(F)$.

Receiver linearity may be characterized a number of ways known to those skilled in the art. The example analysis presented in this disclosure uses third order intermodulation products, commonly referred to as IM3. Active components will typically have either input or output third order intercept points specified so that system design and analysis can be performed to verify acceptable performance levels in the presence of high power signals. The third order output intercept point is commonly referred to as OIP3. The formula for IM3 in terms of a component's output signal power $P_{OUT}$ is $$P_{IM3} = 3 \cdot P_{OUT} - 2 \cdot OIP3,$$

where $P_{IM3}$ is the power level of the third order intermodulation components. It is desirable to maintain the IM3 output power as low as possible since these spurious components represent interference with respect to the desired receive signal, which is the tag's backscatter response.

The conventional RFID reader receiver 1500 of FIG. 2 uses one or more LNAs 1510 for a gain stage at RF in order to essentially set the noise figure ahead of the demodulation mixer 1520. LNAs typically have 10 dB to 20 dB of gain with a noise figure of 2 to 4 dB. A high linearity LNA will typically have an OIP3 of approximately +30 dBm.

Typical demodulation mixers 1520 have conversion loss from 9 dB to 13 dB, with the mixer noise figure equal to its loss, i.e. NF=L. A highly linear mixer with such a conversion loss will typically have an OIP3 around +20 dBm.

The baseband gains and filters in RFID receivers 1500, 1502, and 1504 each have associated gains (or losses) and noise figures. The noise figure of a low noise baseband amplifier will usually be at best about 15 dB. Highly linear baseband amplifiers may have OIP3 of approximately +44 dBm.

The table below shows the gain-noise figure and linearity analysis for the conventional RFID receiver 1500 line up shown in FIG. 2. In this implementation first component 1 (referring to FIG. 6, the table above, and the Friis noise figure formula) is a ferrite circulator which is one possible embodiment of TX-RX coupler 1420. The ferrite circulator has 0.5 dB of loss. Second component 2 is a transmitter cancellation RF signal combiner with a 3 dB loss, also a part of TX-RX coupler 1420. Third component 3 is a low noise amplifier 1510 with a gain of 17 dB and noise figure of 2.5 dB. These are typical numbers for high linearity LNAs in the UHF and microwave bands. Fourth component 4 is quadrature down conversion mixer 1520 with a conversion loss of 9 dB. In this case the receiver lineup has a fifth component comprising the baseband amplifier and filtering with 15 dB noise figure and 20 dB of gain. Baseband amplifiers generally have much poorer noise figure than RF amplifiers.

|  | Component 1 | Component 2 | Component 3 | Component 4 | Component 5 |
|---|---|---|---|---|---|
| Gain "G" (dB) | −0.5 | −3.0 | 17.0 | −9.0 | 19.5 |
| Gain "g"(linear) | 0.9 | 0.5 | 50.1 | 0.1 | 89.1 |
| Noise Figure, "NF" (dB) | 0.5 | 3.0 | 2.5 | 9.0 | 15.0 |
| Noise Factor, "F" (linear) | 1.1 | 2.0 | 1.8 | 7.9 | 31.6 |
| Cumulative gain, g (linear) | 0.9 | 0.4 | 22.4 | 2.8 | 251.2 |
| Cumulative gain, G (dB) | −0.5 | −3.5 | 13.5 | 4.5 | 24.0 |
| Cumulative Noise Factor | 1.1 | 2.2 | 4.0 | 4.3 | 15.2 |
| Cumulative Noise Figure (dB) | 0.5 | 3.5 | 6.0 | 6.3 | 11.8 |
| Output Power (dBm) | −20.5 | −23.5 | −6.5 | −15.5 | 4.0 |
| OIP3 (dBm) |  |  | 30.0 | 20.0 | 44.0 |
| IM3 (dBm), −20 dBm input |  |  | −79.5 | −86.5 | −67.0 |
|  | TX-RX Coupler Ferrite Circulator | TX-RX Coupler Summing Coupler | Receiver LNA | Receiver Mixer | Baseband Gain & Filter |

The gain and noise figure calculations shown in the table above result in a final gain and noise figure being G=24 dB and NF=11.8 dB. This is clearly better than the maximum noise figure of 24 dB shown in the example link budget of FIG. 5. It is often said by RF receiver design engineers that in a well-designed receive chain only the noise factor of the first amplifier should be significant. The lineup in FIG. 2 and the table above is an example of this design mindset. However, the design of FIG. 2 is expensive and may suffer from inadequate linearity due to the higher broadband gain at RF. The bottom three lines of the table show the IM3 levels when a −20 dBm signal is present at the input. The result for the conventional RFID receiver design above is −67 dBm intermodulation component levels.

The table below shows the gain-noise figure analysis for the RFID reader design disclosed in FIG. 3.

|  | Component 1 | Component 2 | Component 3 | Component 4 |
|---|---|---|---|---|
| Gain "G" (dB) | −6.0 | 3.0 | 20.0 | 7.0 |
| Gain "g"(linear) | 0.3 | 2.0 | 100.0 | 5.0 |
| Noise Figure, "NF" (dB) | 6.0 | 12.0 | 15.0 | 15.0 |
| Noise Factor, "F" (linear) | 4.0 | 15.8 | 31.6 | 31.6 |
| Cumulative gain, g (linear) | 0.3 | 0.5 | 50.1 | 251.2 |
| Cumulative gain, G (dB) | −6.0 | −3.0 | 17.0 | 24.0 |
| Cumulative Noise Factor | 4.0 | 63.1 | 124.2 | 124.8 |
| Cumulative Noise Figure (dB) | 6.0 | 18.0 | 20.9 | 21.0 |
| Output Power (dBm) | −26.0 | −23.0 | −3.0 | 4.0 |
| OIP3 (dBm) |  | 30.0 | 44.0 | 44.0 |
| IM3 (dBm), −20 dBm input |  | −129.0 | −97.0 | −76.0 |
|  | TX-RX Coupler | Active Mixer | Baseband Gain & Filter | Baseband Gain & Filter (optional) |

In the example embodiment of the table above first component 1 is a directional coupler used as a four port device for transmitter cancellation via the reflective modulator mechanism analogous to the approach described by Kim et al in "A Passive Circulator for RFID Application with High Isolation using a Directional Coupler", in *Proceedings of the 36th European Microwave Conference,* 2006. The directional coupler is part of the TX-RX coupler 1420 and has a receiver coupling loss of 6 dB in this example. The coupling factor is a design decision which affects the receiver noise figure and the post power amplifier loss in the transmission path. Higher coupling presents less loss in the receiver path, but more loss in the transmitter path. An example embodiment presented here opts for a 6 dB coupling factor.

First component 1 is passively connected to second component 2, which is an active quadrature down conversion mixer 1522 with a conversion gain of 3 dB and a noise figure of 12 dB. Third component 3 comprises the baseband amplifier and filtering with 15 dB noise figure and 20 dB of gain. The gain and noise figure calculations shown in the table above result in a gain and noise figure being G=24 dB and NF=21 dB at the output of fourth component 4. This is better than the maximum noise figure of 24 dB shown in the example link budget of FIG. 5, but at improved linearity. The bottom three lines of the table show the IM3 levels when a −20 dBm signal is present at the input. The result for this improved RFID receiver design using a TX-RX coupler passively connected to an active mixer is −76 dBm intermodulation component levels.

Indeed, while the very low noise figure design of FIG. 2 may be needed for semi-passive backscatter tags which have much lower sensitivity than −25 dBm, the design of FIG. 2 is will have linearity problems and may produce IM3 noise components which negate the benefits of its low noise figure. The improved design of FIG. 3 has almost 10 dB better IM3 performance with the example high interference level. Furthermore, IM3 components are frequency dependent. By putting the bulk of the gain at baseband where the lowpass filtering occurs the IM3 components can be mitigated more effectively. Note that the IM3 level at the mixer for the conventional design of FIG. 2 are −86.5 dBm, while for the improved design of FIG. 3 they are at −129 dBm. Depending on the frequency components present in the interference and IM3, the improved RFID receiver design of FIG. 3 has significant advantage. The baseband includes filtering to reduce the bandwidth down to the a few kilohertz or up to a megahertz or so. This limits the interference and preferably the receiver gain is placed here in baseband where out-of-band interference is removed.

The table below shows the gain-noise figure analysis for the improved RFID reader design disclosed in FIG. 4. In this implementation first component 1 is a 6 dB directional coupler which is passively connected to second component 2 which is an active mixer 1522 having a conversion gain of 3 dB and noise figure of 12 dB. In this implementation third component 3 is a transformer stage which has a voltage gain of 6 dB and noise figure of 0 dB. This 0 dB noise figure is possible since the transformer has no active or resistive elements. Fourth component 4 comprises the baseband amplifier and filtering with 15 dB noise figure and 20 dB of gain. The gain and noise figure calculations shown in the table above result in a gain and noise figure being G=24 dB and NF=18.9 dB at the output. This is again better than the maximum noise figure of 24 dB shown in the example link budget of FIG. 5.

|  | Component 1 | Component 2 | Component 3 | Component 4 |
| --- | --- | --- | --- | --- |
| Gain "G" (dB) | −6.0 | 3.0 | 6.0 | 21.0 |
| Gain "g"(linear) | 0.3 | 2.0 | 4.0 | 125.9 |
| Noise Figure, "NF" (dB) | 6.0 | 12.0 | 0.0 | 15.0 |
| Noise Factor, "F" (linear) | 4.0 | 15.8 | 1.0 | 31.6 |
| Cumulative gain, g (linear) | 0.3 | 0.5 | 2.0 | 251.2 |
| Cumulative gain, G (dB) | −6.0 | −3.0 | 3.0 | 24.0 |
| Cumulative Noise Factor | 4.0 | 63.1 | 63.1 | 78.4 |
| Cumulative Noise Figure (dB) | 6.0 | 18.0 | 18.0 | 18.9 |
| Output Power (dBm) | −26.0 | −23.0 | −17.0 | 4.0 |
| OIP3 (dBm) |  | 30.0 |  | 44.0 |
| IM3 (dBm), −20 dBm input |  | −129.0 | −123.0 | −76.0 |
|  | TX-RX Coupler | Active Mixer | Transformer | Baseband Gain & Filter |

The example devices and methods in this disclosure can achieve the required receiver sensitivity for passive backscatter UHF tag demodulation in FCC and ETSI regulatory environments with low power, low complexity, and high linearity. In some embodiments, a general-purpose processor such as a DSP, microcontroller or microprocessor is used and non-transitory firmware, software, or microcode can be stored in a tangible storage medium that is associated with the device. Any such device may be referred to herein as a "processor" or a "microprocessor." Such a medium may be a memory integrated into the processor, or may be a memory chip that is addressed by the controller to perform control functions. Such firmware, software or microcode is executable by the processor and when executed, causes the processor to perform its control functions. Such firmware or software could also be stored in or on a tangible medium such as an optical disk or traditional removable or fixed magnetic medium such as a disk drive used to load the firmware or software into an RFID system.

It should be noted that any data and information necessary to support the execution of instructions for any embodiment of the disclosure can be placed in a removable storage medium as well. These could be stored on a disk as well, especially for development purposes or for maintenance and update purposes. Such a storage medium may be accessed either directly or over a network, including the Internet.

Any of the directional couplers employed in TX-RX coupler 1420 may be implemented as discrete components, as microstrip or stripline components, built from reactive components, or any combination thereof. While example embodiments of 1420 discussed in this disclosure have used directional couplers, it would also be possible to use a passively connected receiver design by using a ferrite circulator to minimize losses in the receiver path. Other variants are also possible without departing from the ideas disclosed herein and will be evident to those skilled in the art.

Although specific embodiments have been illustrated and described herein, those of ordinary skill in the art appreciate that any arrangement which is calculated to achieve the same purpose may be substituted for the specific embodiments shown and that the invention has other applications in other environments. This application is intended to cover any adaptations or variations of the present invention. The following claims are in no way intended to limit the scope of the invention to the specific embodiments described herein.

The invention claimed is:

1. A system for reading RFID tags, the system comprising:

an antenna port to receive an incoming signal from an RFID tag;

an active mixer passively connected to the antenna port to convert the incoming signal to a baseband signal;

a processor to decode the baseband signal; and a transformer connected between the active mixer and the processor.

2. The system of claim 1 further comprising:

a filter connected between the active mixer and the processor; and a gain stage connected between the active mixer and the processor.

3. The system of claim 2 wherein the transformer is connected between the active mixer and the gain stage.

4. The system of claim 1 further comprising:

an RFID transmitter;

a local oscillator connected to the RFID transmitter and the active mixer; and a TX-RX coupler connected to the transmitter and the antenna port, wherein the active mixer is passively connected to the antenna port through a receive port of the TX-RX coupler.

5. The system of claim 4 further comprising:

a filter connected between the active mixer and the processor; and a gain stage connected between the active mixer and the processor.

6. The system of claim 5 wherein the transformer is connected between the active mixer and the gain stage.

7. A method of processing an incoming signal from an RFID tag, the method comprising:
  passively supplying the incoming signal to an active mixer;
  down converting the incoming signal to a baseband signal using the active mixer and a local oscillator signal;
  stepping up a voltage of the baseband signal received from the active mixer;
  passing the baseband signal to a processor; and
  decoding, using the processor, the baseband signal to produce an RFID symbol.

8. The method of claim 7 further comprising transmitting an RF carrier signal to cause the RFID tag to produce the incoming signal.

9. The method of claim 8 further comprising filtering the baseband signal prior to passing the baseband signal to the processor.

10. The method of claim 9 further comprising passing the baseband signal through a gain stage.

11. The method of claim 10 wherein the stepping up of the voltage of the baseband signal occurs prior to both passing the signal through the gain stage and filtering the baseband signal.

12. Apparatus comprising:
  means for passively supplying an incoming RFID signal to an active mixer;
  means for down converting the incoming RFID signal to a baseband signal;
  means for supplying the baseband signal to a processor; and
  means for decoding the baseband signal to produce an RFID symbol.

13. The apparatus of claim 12 further comprising means for transmitting an RF carrier signal to cause an RFID tag to produce the incoming RFID signal.

14. The apparatus of claim 13 wherein the means for supplying further comprises means for filtering the baseband signal.

15. The apparatus of claim 14 wherein the means for supplying further comprises means for applying gain to the baseband signal.

16. The apparatus of claim 15 wherein the means for supplying further comprises means for stepping up a voltage of the baseband signal.

* * * * *